United States Patent
Culbert et al.

(10) Patent No.: US 6,820,209 B1
(45) Date of Patent: Nov. 16, 2004

(54) POWER MANAGED GRAPHICS CONTROLLER

(75) Inventors: Michael F. Culbert, San Jose, CA (US); Brian D. Howard, Portola Valley, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/566,651

(22) Filed: May 8, 2000

Related U.S. Application Data

(60) Provisional application No. 60/144,590, filed on Jul. 15, 1999.

(51) Int. Cl.[7] ........................... G06F 13/14; G06F 1/04; G06F 1/06; G06F 1/08
(52) U.S. Cl. ........................ 713/501; 345/520
(58) Field of Search ................. 711/167; 713/501, 713/601, 320, 500, 502, 503, 340, 323, 260, 300, 600, 322; 345/519, 428, 10; 710/260, 305

(56) References Cited

U.S. PATENT DOCUMENTS

| | | | | |
|---|---|---|---|---|
| 5,774,704 A | * | 6/1998 | Williams | 713/501 |
| 6,021,506 A | * | 2/2000 | Cho et al. | 713/601 |
| 6,108,015 A | * | 8/2000 | Cross | 345/519 |
| 6,112,310 A | * | 8/2000 | Jun et al. | 713/501 |
| 6,397,343 B1 | * | 5/2002 | Williams et al. | 713/501 |
| 6,438,697 B2 | * | 8/2002 | Atkinson | 713/320 |
| 6,460,125 B2 | * | 10/2002 | Lee et al. | 711/167 |

* cited by examiner

Primary Examiner—Matthew C. Bella
Assistant Examiner—Dalip K. Singh
(74) Attorney, Agent, or Firm—Beyer Weaver & Thomas, LLP

(57) ABSTRACT

A controller (or controller chip) providing reduced power consumption without impacting performance is disclosed. The controller monitors activity of components within the controller which require access to a local memory, and then decreases a clocking frequency for a memory interface to the local memory when the monitoring indicates that reduced amounts of activity are present. Following such a decrease in the clocking frequency, when increased amounts of activity are detected, the clocking frequency is increased for high performance operation. The controller thus tailors the clocking frequency for the memory interface in accordance with the amount of activity of these components that require access to the local memory so that overall less power is used by the controller yet the performance is essentially not hindered. In one embodiment, the controller is a graphics controller, as such controllers require access to local memories.

18 Claims, 6 Drawing Sheets

POWER MANAGED GRAPHICS CONTROLLER

CROSS-REFERENCE TO RELATED APPLICATION

This application claims the benefit of U.S. Provisional Application No. 60/144,590, filed Jul. 15, 1999, and entitled "POWER MANAGED GRAPHICS CONTROLLER", the content of which is hereby incorporated by reference.

BACKGROUND OF THE INVENTION

1. Field of the Invention

The present invention relates to controllers and, more particularly, to graphics controllers used with computer systems.

2. Description of the Related Art

Computer systems conventionally use graphics controller chips to provide high resolution graphics. Graphical controller chips are special purpose processing units that are designed to draw graphics, such as render two-dimensional or three-dimensional shapes, with high performance on a display device. These graphics controller chips are also referred to as graphic accelerators.

Graphics controller chips typically include a local memory, namely Random-Access Memory (RAM), that is used by the graphics controller in producing the complex graphics. For example, a graphics controller typically includes a graphics engine that makes use of the local memory to produce complex graphics. The local memory also acts in part as a frame buffer because it is used to store a frame of image data to be displayed on the display device. Periodically, the displayed images on the display device are refreshed to provide persistence to the images being displayed on the display device. The refresh operation is performed by accessing the image data stored in the frame buffer provided by the local memory. External components of a computer system (e.g., microprocessor) may also stream data into or out of the local memory.

Thus, given the various resources competing for use of the local memory, conventional graphic controller designs normally operate an interface to the local memory at its maximum speed so that the bandwidth with respect to the local memory is maximized. However, in doing so, the power consumption of the electrical circuitry associated with the memory interface is very high. In other words, the speed (or frequency) at which the memory interface is operated determines its power utilization. Thus, conventional approaches have been able to provide fast access to the memory but do so at the expense of wasting significant amounts of power. Efficient use of power is today an important goal for all computer systems, particularly for portable computers when operating on battery power.

Thus, given the ever increasing sensitivity towards power consumption of computer systems, there is a need to manage the power-consumption of graphics controllers.

SUMMARY OF THE INVENTION

Broadly speaking, the invention relates to a controller (or controller chip) that provides reduced power consumption without impacting performance. The controller monitors activity of components within the controller which require access to a local memory, and then decreases a clocking frequency for a memory interface to the local memory when the monitoring indicates that reduced amounts of activity are present. Following such a decrease in the clocking frequency, when increased amounts of activity are detected, the clocking frequency is increased for high performance operation. The controller thus tailors the clocking frequency for the memory interface in accordance with the amount of activity of these components that require access to the local memory so that overall less power is used by the controller yet the performance is essentially not hindered. The invention is particularly well suited for use with graphics controllers, as such controllers require access to local memories.

The invention can be implemented in numerous ways, including as a system, a device, an apparatus, and a method. Several embodiments of the invention are summarized below.

As a method for managing power consumption of a graphics controller having an interface to a local memory, one embodiment of the invention includes the acts of: determining a bandwidth load on the local memory; and providing a clock to the interface, the clock having a frequency dependent upon the bandwidth load, and the interface providing access to the local memory at a rate determined by the frequency of the clock. Preferably, the method reduces power consumption by the graphics controller by reducing the frequency of the clock when the bandwidth load decreases, and then rapidly increasing the frequency of the clock as the bandwidth load increases.

As a method for managing power consumption of a controller having a local memory associated therewith, one embodiment of the invention includes the acts of: receiving status information indicating local memory usage requirements for the local memory of the controller; determining whether the usage requirements are below a threshold condition; and operating the graphics controller to interact with the local memory in accordance with a regular frequency clock when the usage requirements exceed the threshold condition or in accordance with a reduced frequency clock when the local memory usage requirements are below the threshold condition. When the reduced frequency clock is used by the controller, power consumption of the graphics controller is substantially lowered as compared to the power consumption of the controller when the regular frequency clock is used.

As a graphics controller for use with a computer system including a processor, a system bus and a display device, one embodiment of the invention includes: a system bus interface for coupling to the system bus of the computer system; a local memory; a local memory interface coupled to the local memory, the local memory interface controls access to the local memory; a display interface for coupling to the display device of the computer system; an arbitration unit coupled to the system bus interface, the local memory interface, and the display interface, the arbitration unit operates to arbitrate access to the local memory via the local memory interface; and a clock controller operatively connected to at least one of the local memory interface and the local memory, the clock controller producing a first clock for use by the at least one of the local memory interface and the local memory.

As a graphics controller for use with a computer system including a processor, a system bus and a display device, another embodiment of the invention includes: a system bus interface for coupling to the system bus of the computer system; a local memory; a local memory interface coupled to the local memory, the local memory interface controls access to the local memory; a display interface for coupling to the display device of the computer system; a graphics engine operatively connected to the local memory interface, the graphics engine renders complex images to be displayed on the display device; means for monitoring activity of at least one of the system bus interface and the graphics engine to produce a memory access load indication; and means for producing a memory clock signal for use by at least one of the local memory interface and the local memory, the memory clock signal having a frequency that varies depending upon the memory access load indication, wherein the frequency is lower when the memory access load indication indicates a lack of or reduction in activity.

The advantages of the invention are numerous. Different embodiments or implementations may have one or more of the following advantages. One advantage of the invention is that controllers can operate with substantial power savings while still providing high performance. Another advantage of the invention is that computer systems, particularly battery-powered computer systems, overall consume less power when the controller according to the invention is utilized. Hence, with battery-powered computer systems, battery lifetime (before needing to be recharged) is extended by the invention.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to a graphical controller that provides reduced power consumption without impacting performance. The graphical controller monitors activity of components within the graphical controller which require access to a local memory, and then decreases a clocking frequency for a memory interface to the local memory when the monitoring indicates that reduced amounts of activity are present. Following such a decrease in the clocking frequency, when increased amounts of activity are detected, the clocking frequency is increased for high performance operation. The graphical controller thus tailors the clocking frequency for the memory interface in accordance with the amount of activity of these components that require access to the local memory so that overall less power is used by the graphics controller yet the performance is essentially not hindered. The local memory and/or other components of the graphical controller can additionally take advantage of the tailored clocking frequency to provide further power savings.

Embodiments of the invention are discussed below with reference to FIGS. 1–6. However, those skilled in the art will readily appreciate that the detailed description given herein with respect to these figures is for explanatory purposes as the invention extends beyond these limited embodiments.

Figure 1:
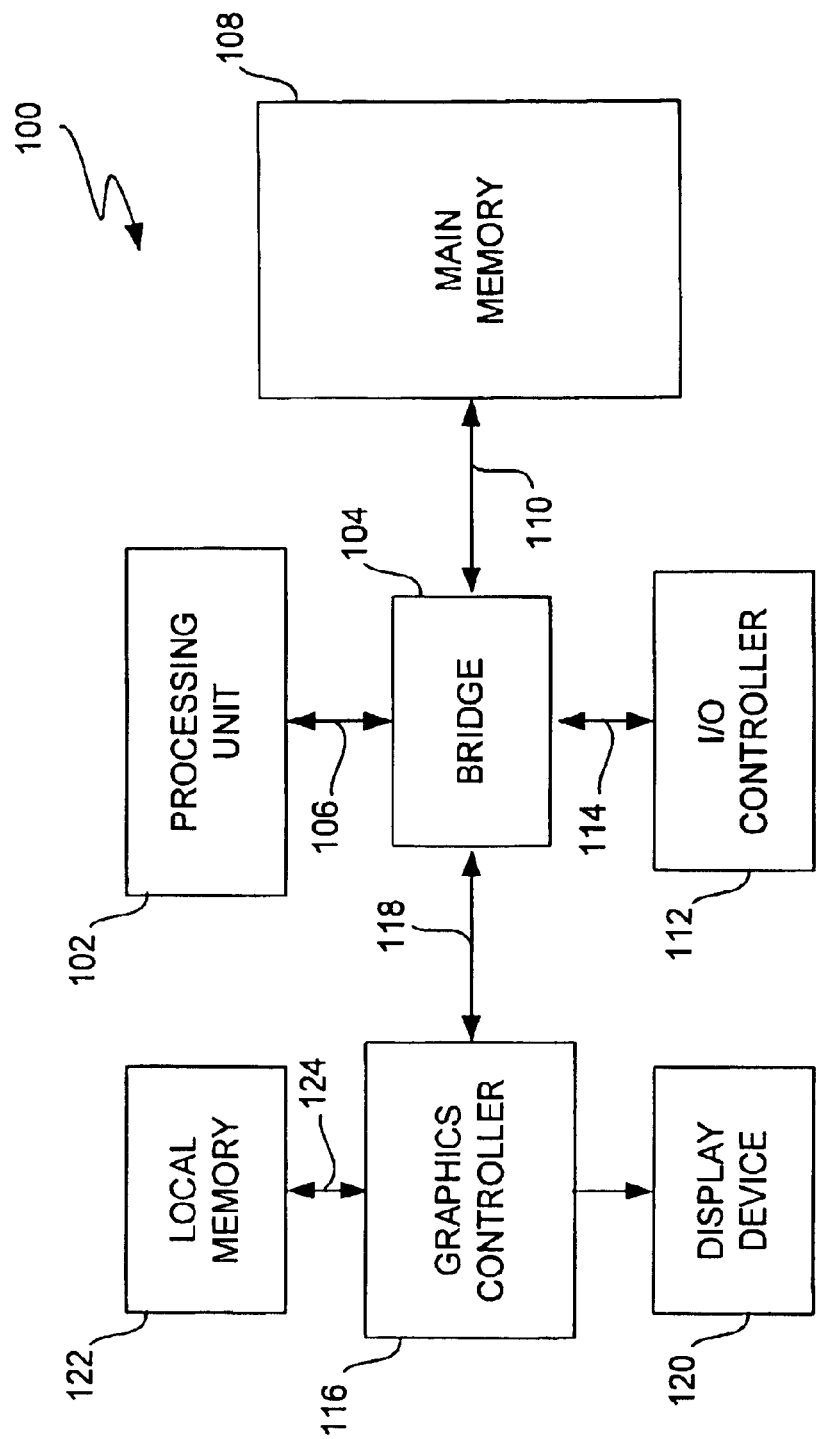
FIG. 1 is a block diagram of a computer system according to one embodiment of the invention.

FIG. 1 is a block diagram of a computer system 100 according to one embodiment of the invention. The computer system 100 includes a processing unit 102 that couples to a bridge 104 through a processor bus 106. The computer system 100 also includes a main memory 108 that couples to the bridge 104 via a memory bus 110. In one implementation, the processing unit 102 is a microprocessor and the main memory 108 is a Random-Access Memory (RAM) and may further include a Read-Only Memory (ROM).

In addition, the computer system 100 includes an input/output (I/O) controller 112 that couples to the bridge 104 via an I/O bus 114. The I/O controller 112 operates to control interactions with one or more peripheral devices that can be coupled to the computer system 100. The I/O controller 112 operates by exchanging data between the computer system 100 and the peripherals devices.

The computer system 100 also includes a graphics controller 116 that couples to the bridge 104 via a system bus 118. The graphics controller 116 provides processing of display commands to produce complex graphical images in an accelerated manner for display on a display device 120. The graphics controller 116 supports, for example, two-dimensional (2D) and three-dimensional (3D) rendering of graphical images for display on the display device 120. However, the graphics controller 116 can also display text and simple shapes without needing to utilize the sophisticated processing capabilities of the graphics controller with respect to 2D and 3D images.

The graphics controller 116 couples to a local memory 122 through a memory bus 124. The local memory 122 provides storage of data utilized by the graphics controller 116. The local memory 122 is a RAM, and often a specialized high-speed RAM. More particularly, the local memory 122 can, in part, implement a frame buffer that stores the data that is used to produce an image on the display device 120. The local memory 122 is used not only to refresh the display device 120 but also to provide data storage for the processing engines (e.g., 2D and 3D graphics engines) provided within the graphics controller 116 and to receive or exchange data over the system bus 118 under the control of the processing unit 102 or the graphics controller 116. As such, the local memory 122 and the memory bus 124 are heavily used resources of the computer system 100.

Accordingly, the bandwidth for the local memory 122 has a fixed maximum amount that must be shared between the various users of the local memory 122. In particular, the users of the local memory 122 include the refresh engine within the graphics controller 116 that serves to provide the image on the display device 120, a system bus interface that serves indicate the extent to which the processing unit 102 or the I/O controller 112 desire to utilize the local memory 122, and graphics rendering engines within the graphics controller 116 that utilize the local memory 122 in performing various computations.

As such, many conventional designs operate the memory bus 124 and its associated memory interface utilized within the graphics controller 116 at their maximum speed so that the bandwidth with respect to the local memory 122 is maximized. However, when the memory bus 124 and the associated memory interface are operated at maximum capacity, the power consumption of the memory bus 124 and its associated memory interface consume power at their maximum rate. According to the invention, the power consumption of the graphics controller 116 is managed to provide substantial power savings. The power savings results from reducing the power consumed by the memory interface and the memory bus 124 associated with the local memory 122 and the local memory 122 itself when these components can be operated at less than normal (maximum) speeds without hindering performance of the graphic controller 116. Power savings can also result from reduction of the power consumed by other components (e.g., core logic) of the graphics controller 116.

According to one embodiment, the graphics controller 116 operates to reduce a clocking frequency for the memory interface and the memory bus 124 and the local memory 122 when the bandwidth required with respect to the local memory 122 is less than its maximum bandwidth. As a result, power consumption by these components of the graphics controller 116 is reduced when less than maximum bandwidth conditions exist. More particularly, in one embodiment, the graphics controller 116 monitors the bandwidth load with respect to the local memory 122 and then accordingly controls the frequency of a clock for access to the local memory 122 to reduce power consumption. The controlled clock controls the rate of operation of the local memory 122, the memory bus 124 and the memory interface within the graphics controller 116. On the other hand, the frequency of the controlled clock rapidly increases when it is determined that additional bandwidth with respect to access to the local memory 122 is required.

The bridge 104 can serve to provide interactivity between the various buses utilized by the computer system 100. The bridge 104 could simply be an arbiter if the processor bus 106, the memory bus 110, the I/O bus 114 and the system bus 118 if all were of the same bus type, such as PCI. However, typically these various buses follow different standards and, therefore, the bridge 104 serves to perform the adjustments necessary to bridge between the particular buses.

Figure 2:
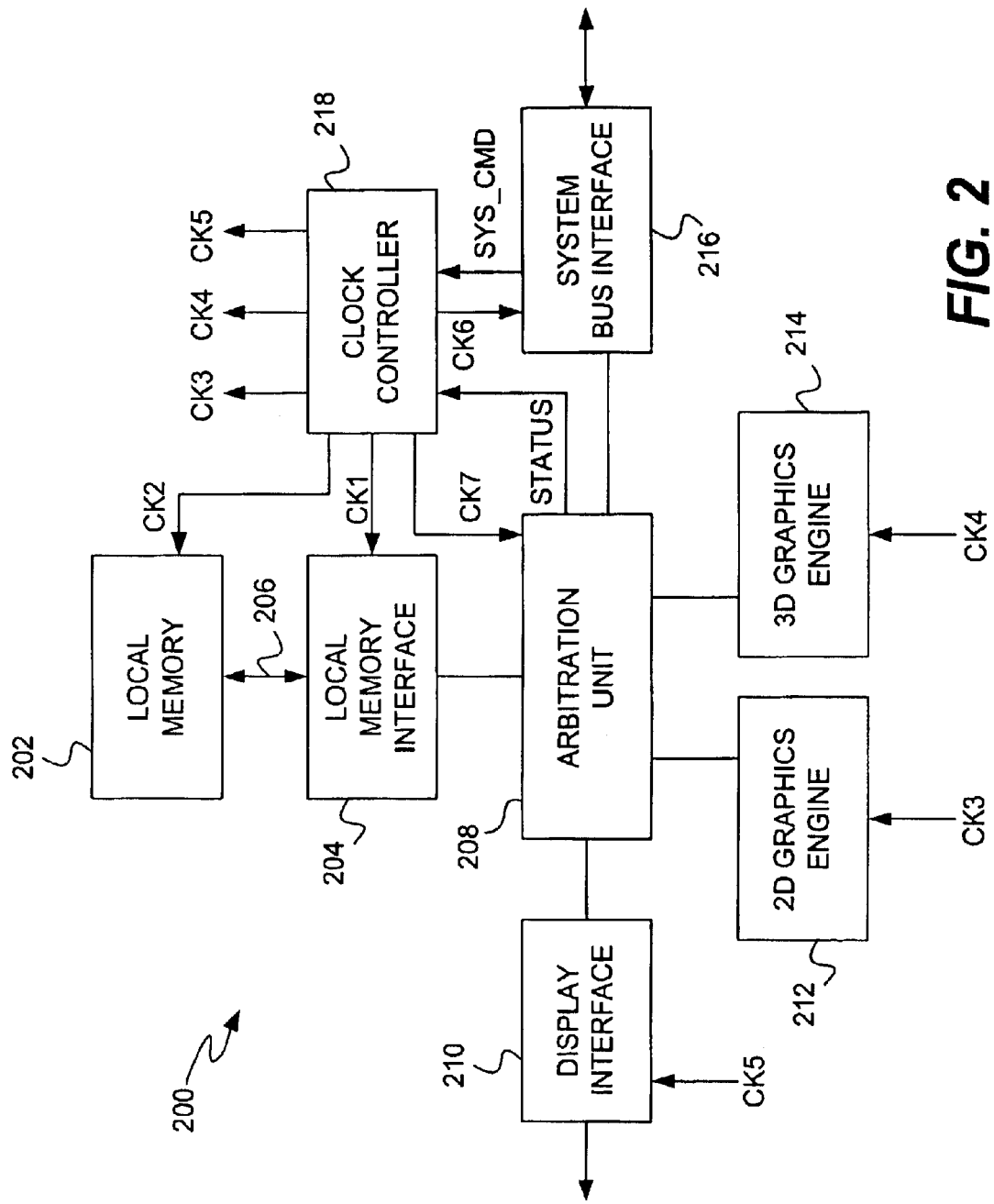
FIG. 2 is a block diagram of a graphics controller according to one embodiment of the invention.

FIG. 2 is a block diagram of a graphics controller 200 according to one embodiment of the invention. The graphics controller 200 is, for example, suitable for use as the graphics controller 116 together with the local memory 122 and the memory bus 124 illustrated in FIG. 1. In other words, the graphics controller 200 incorporates a local memory in this embodiment. Hence, the local memory 202 can be either internal to a graphics controller chip or separate and coupled to a graphics controller chip, but in either case dedicated to the graphics controller.

The graphics controller 200 includes a local memory 202 and a local memory interface 204. The local memory interface 204 controls the access to the local memory 202 through a memory bus 206. The graphics controller 200 also includes an arbitration unit 208. The arbitration unit 208 effectively manages access to the local memory 202 by various resources of the graphics controller 200 that require usage of the local memory 202. These various resources within the graphics controller 200 include a display interface 210, a 2D graphics engine 212, a 3D graphics engine 214, and a system bus interface 216. The display interface 210 provides an interface from the graphics controller 200 to a display device, such as the display device 120 illustrated in FIG. 1. The 2D graphics engine 212 and the 3D graphics engine 214 are processing units within the graphics controller 200 that perform complex computations in order to display 2D and 3D graphics on the display device. The 2D graphics engine 212 and the 3D graphics engine 214 are thus special-purpose processors or functional units that can perform the necessary complex computations very rapidly. The system bus interface 216 interfaces the graphics controller 200 to a system bus, such as the system bus 118 illustrated in FIG. 1. The system bus interface 216 thus enables components of a computer system to utilize the graphics controller 200. For example, a processing unit or an I/O controller of the computer system can access the local memory 202 (through the local memory bus 206, the local memory interface 204 and the system bus interface 216) such as to stream data into or out of the local memory 202.

The arbitration unit 208 not only arbitrates which of the resources within the graphics controller gain access to the local memory 202 but also monitors the extent to which local memory 202 access is needed by the resources within the graphics controller 200. Typically, the display interface 210 is required to periodically refresh the display device and thus has a predetermined requirement for usage of the local memory 202 that stores the data to be displayed. Typically, the data to be displayed is stored in a frame buffer that would be provided within the local memory 202. The 2D graphics engine 212 and the 3D graphics engine 214 are activated only when the graphics controller 200 needs to produce 2D or 3D graphics, in which case access to the local memory 202 would be needed. However, in many cases, 2D and 3D graphics are not required by the graphics controller 200 and, in such cases, these processing resources do not need to utilize the local memory 202. The system bus interface 216 is typically used by the processing unit or the I/O controller via the system bus to stream data into or out of the local memory 202. Hence, when such data streaming is being performed, the system bus interface 216 needs access to the local memory 202. However, when such data streaming or other operations over the system bus do not require the use of the local memory 202, then the system bus interface 216 does not need access to the local memory 202.

Therefore, the arbitration unit 208 determines which of the resources, besides the display interface 210, needs access to the local memory 202. When less than all of these resources need access to the local memory 202, the local memory interface 204, the local memory 202 and the memory bus 206 can be operated at a reduced speed because the amount of bandwidth required with respect to the local memory 202 is reduced. The reduction in speed is achieved by controlling the frequency of a clock signal supplied to the memory interface 204, the local memory 202 and the memory bus 206. The frequency can be controlled in small or larger increments.

The arbitration unit 208 produces a status signal (STATUS) based on the monitoring of the extent to which local memory 202 access is needed by the resources. The status signal (STATUS) is supplied to a clock controller 218 that is also provided within the graphics controller 200. The clock controller 218 serves to produce and distribute clock signals to the resources within the graphics controller 200. In particular, the clock controller 218 supplies a first clock (CK1) to the local memory interface 204 and supplies a second clock (CK2) to the local memory 202. The first clock and the second clock can thus be reduced by the clock controller 218 when the status signal (STATUS) indicates that the bandwidth load on the local memory 202 (and thus the local memory interface 204 and the memory bus 206) is reduced. When the first and second clocks (CK1 and CK2) are reduced, the overall power savings of the graphics controller 200 is substantially improved. In addition, the clock controller 218 can supply a third clock signal (CK3) to the 2D graphics engine 212 and can supply a fourth clock signal (CK4) to the 3D graphics engine 214. To reduce power consumption, the clock controller 218 can also stop the third clock signal (CK3) being supplied to the 2D graphics engine 212 to effectively shut down the 2D graphics engine 212 when its processing resources are not being utilized. Likewise, when the processing resources of the 3D graphics engine 214 are not need, the clock controller 218 can stop the fourth clock signal (CK4) from being supplied to the 3D graphics engine 214.

Still further, the system bus interface 216 can also provide a system command (SYS_CMD) to the clock controller 218. The system command (SYS_CMD) is a command that is provided by the processing unit 102 (typically requested by an operating system executed by the processing unit 102). The system command (SYS_CMD) signals the clock controller 218 to operate in a particular fashion. For example, the system command (SYS_CMD) can provide software control to override or assist the status signal (STATUS). For example, if a software application running on the computer system understands that it does not need 3D graphics, then the system command (SYS_CMD) can signal the clock controller 218 to stop the fourth clock signal (CK4) and thus conserve power that the 3D graphics engine would otherwise consume. As another example, if the processing unit of the computer system itself enters a low-power state, then the software application (e.g., operating system) can signal the clock controller 218 via the system command (SYS_CMD) that it will not need access to the local memory until it returns to a normal-power state. Also, the system command (SYS_CMD) can also signal the clock controller 218 to override the status signal (STATUS) such that the first and second clocks (CK1 and CK2) supplied to the local memory interface 204 and the local memory 202 are not reduced but remain at their maximum rates.

Figure 3A:
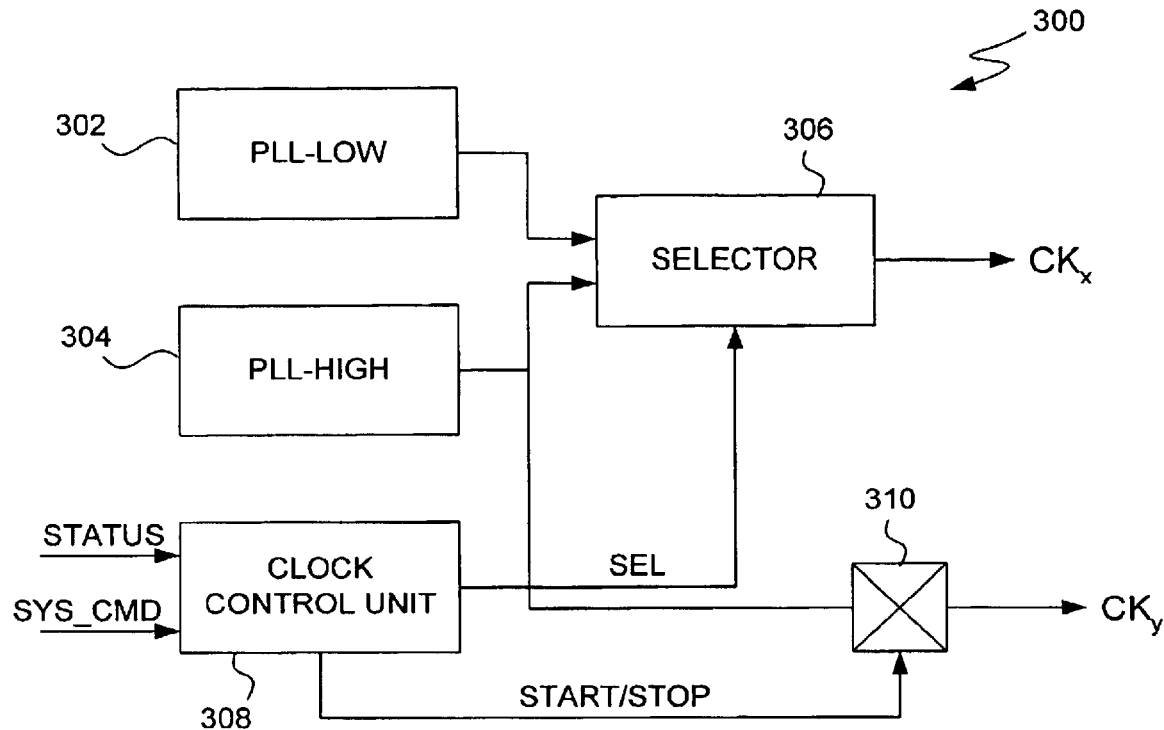
FIG. 3A is a block diagram of a clock controller according to one embodiment of the invention.

FIG. 3A is a block diagram of a clock controller 300 according to one embodiment of the invention. The clock controller 300 is, for example, suitable for use as the clock controller 218 illustrated in FIG. 2. The clock controller 300 includes a low-frequency Phase Lock Loop (PLL) 302 and a high-frequency PLL 304. The low-frequency PLL 302 provides a low frequency clock signal to a selector 306, and the high-frequency PLL 304 supplies a high frequency clock signal to the selector 306. The selector 306 operates to select one of the low frequency clock signal and the high frequency clock signal as a first output clock (CKx). The selector 306 switches back and forth between the high and low frequency clocks "cleanly" without violating the minimum half-cycle width for the first output clock (CKx). In other words, the selector 306 swiches in a manner such that no significant glitches or spikes result in the first output clock (CKx). The selection performed by the selector 306 is controlled by a select signal (SEL) provided by a clock control unit 308. The clock control unit 308 receives a status signal (STATUS) and a system command (SYS_CMD), such as from the arbitration unit 208 and the system bus interface 216 of FIG. 2. From these two inputs, the clock control unit 308 determines the appropriate select signal (SEL) such that the desired one of the low frequency clocks and the high frequency clock is selected. Typically, the first output clock (CKx) would be supplied, for example, to the local memory interface 204 and/or the local memory 202 for the graphics controller 200 illustrated in FIG. 2. The clock controller 300 can also produce additional clocks. The clock controller 300 can output a second output clock (CKy) for use by other resources within the graphics controller. The second output clock (CKy) is produced by a clock stopper 310 within the clock controller 300. The clock stopper 310 "cleanly" starts and stops the second output clock (Cky) (i.e., without substantial glitches or spikes). The clock stopper 310 operates to either stop the output of the second output clock (CKy) or allow the high frequency clock from the high-frequency PLL 304 to be output as the second output clock (CKy). The clock stopper 310 is controlled by a start/stop signal (START/STOP) provided by the clock control unit 308. The start/stop (START/STOP) signal is determined by the clock control unit 308 in accordance with the status signal (STATUS) and the system command (SYS_CMD).

Figure 3B:
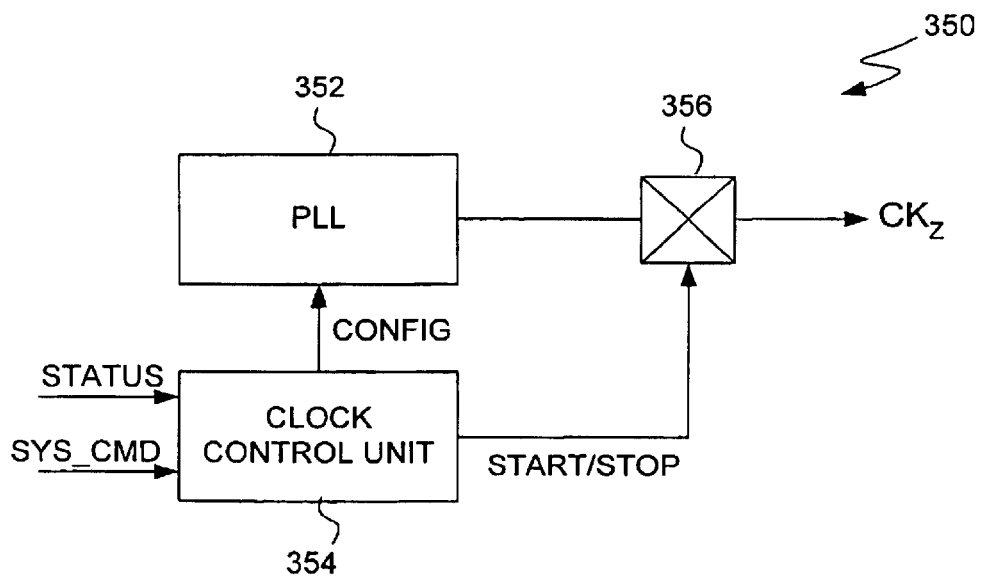
FIG. 3B is a block diagram of a clock controller according to another embodiment of the invention.

FIG. 3B is a block diagram of a clock controller 350 according to another embodiment of the invention. The clock controller 350 is, for example, suitable for use as the clock controller 218 illustrated in FIG. 2. The clock controller 350 includes a PLL 352 that is configured to operate at a particular frequency by a configuration signal (CONFIG) provided by a clock control unit 354. The clock control unit 354 receives a status signal (STATUS) and a system command (SYS_CMD). Using the status signal (STATUS) and the system command (SYS_CMD), the clock control unit 354 not only produces the configuration signal (CONFIG) but also a start/stop signal (START/STOP) that is supplied to a clock stopper 356. The PLL 352 generates a clock at a particular frequency as set by the configuration signal (CONFIG). The particular frequency can vary between a low minimum frequency and a high maximum frequency. The generated clock from the PLL 352 is then supplied to the clock stopper 356, and the clock stopper 356 either outputs the generated clock as an output clock (CKz) or blocks the output of the clock. The clock stopper 356 is controlled by the start/stop signal (START/STOP). The embodiment described in FIG. 3B may require more time to change the clock frequencies than does the embodiment in FIG. 3A.

Figure 4:
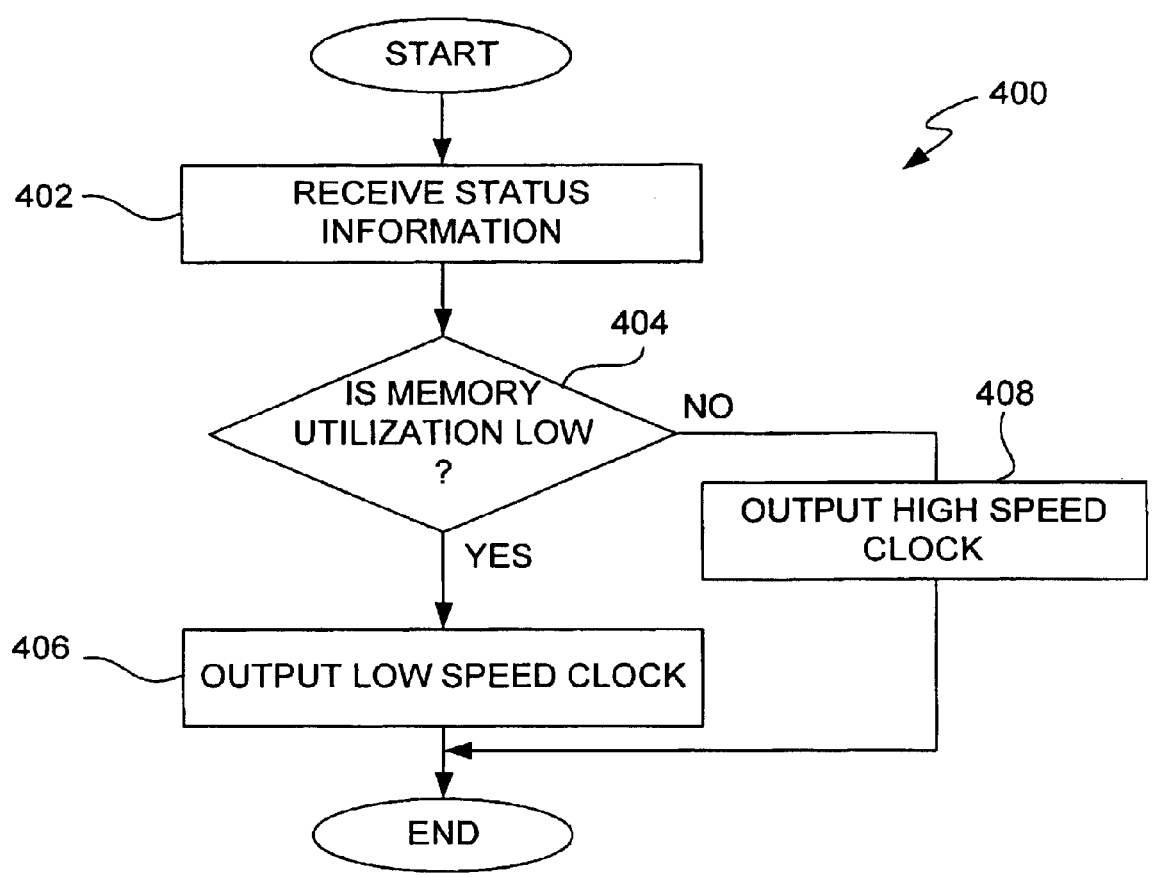
FIG. 4 is a flow diagram of power management processing for a graphics controller according to one embodiment of the invention.

FIG. 4 is a flow diagram of power management processing 400 for a graphics controller according to one embodiment of the invention. The power management processing 400 is, for example, performed by the graphics controller 116 illustrated in FIG. 1.

The power management processing 400 initially receives 402 status information. Status information is, for example, information provided by the arbitration unit 208 that indicates the extent to which resources within a graphics controller require memory access to a local memory for the graphics controller. Next, it is determined 404 whether memory utilization is low based on the status information. In other words, the status information indicates those of the resources that are active and need memory access. When it is determined 404 that memory utilization is low, a low speed clock is output 406. On the other hand, when it is determined 404 that memory utilization is not low (i.e., high memory utilization conditions), then a high speed clock is output 408. After the appropriate clock is output, the power management processing 400 is complete and ends. Typically, the power management processing 400 is an ongoing process that continuously repeats so as to dynamically adjust the speed of the clock being output as the memory utilization conditions change. As such, the power management processing 400 can rapidly return to output the high speed clock after outputting the low speed clock so that the power savings during the output of the slow speed clock does not cause a noticeable reduction in performance when various resources later need more memory access.

The operation of the power management processing 400 is further explained by the following example. Consider a graphics controller having a memory interface, a display interface, a system bus interface and functional units (e.g., 2D or 3D graphics engines) all of which at times require memory access to a local memory. The status information can thus indicate when these interfaces or functional units do require memory access. In one implementation, the display interface is assumed to always need memory access due to ongoing display refresh obligations and that the other interfaces and the functional units are assumed to need memory access whenever they are active. Here, in such an implementation, the status information can indicate which of the interfaces and functional units is active. Then, if only the display interface is active, the memory access load is deemed light and thus the low speed clock is output. With the low clock speed, the graphics controller can still properly service the memory access required by the display interface. On the other hand, if one or more of the other interfaces or functional units is also active, then the memory access load can be deemed heavy and thus the high speed clock is output. Using this approach, whenever the low speed clock is output, one or more of the local memory interface, the memory bus or the local memory consume reduced amounts of power and thus the graphics controller is overall saving power. Of course, various intermediate clock speeds could be provided and selected based on the particular amount of the memory access load.

Figure 5:
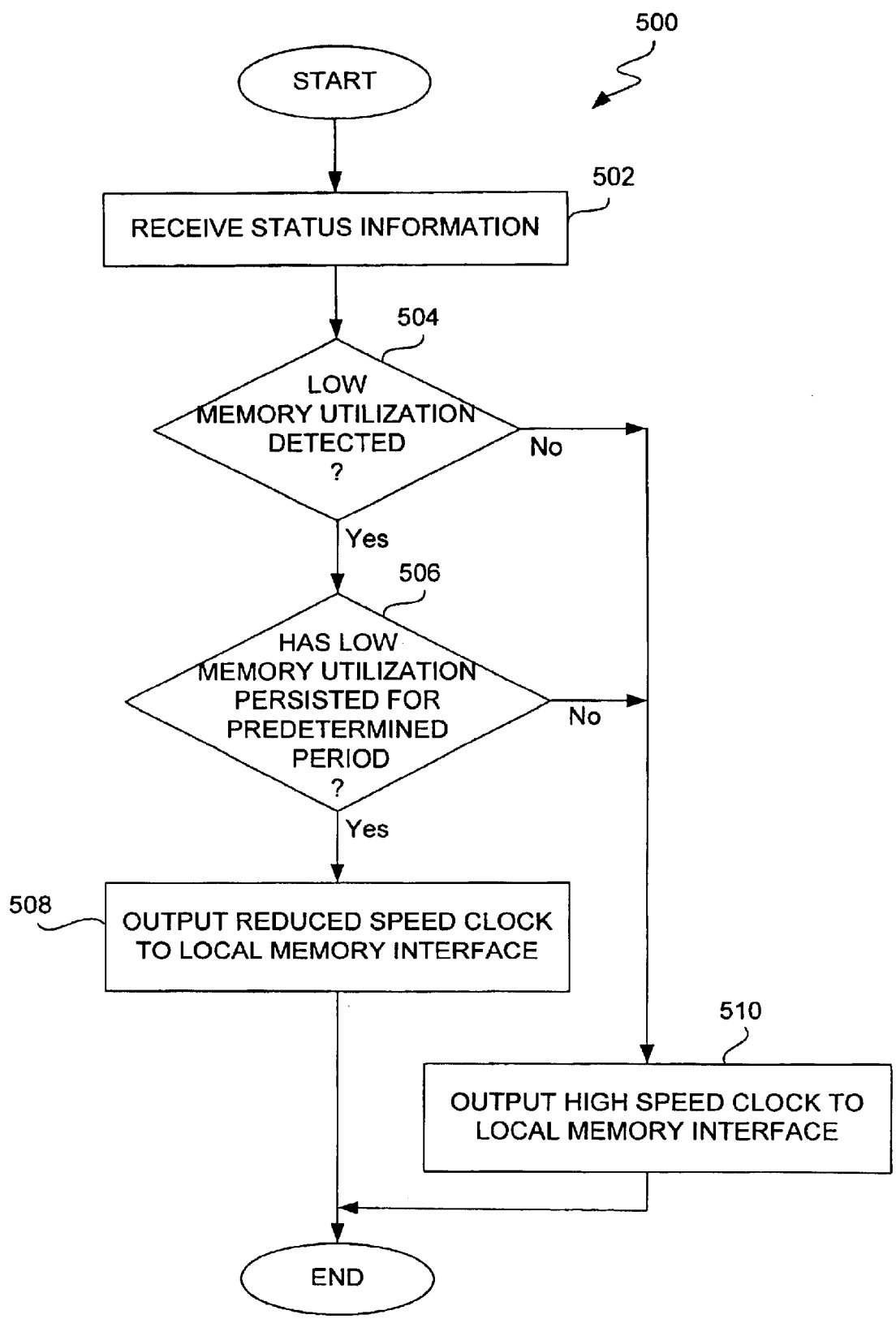
FIG. 5 is a flow diagram of memory interface power management processing according to one embodiment of the invention.

FIG. 5 is a flow diagram of memory interface power management processing 500 according to one embodiment of the invention. The memory interface power management processing 500 is, for example, suitable for use by the graphics controller 200 illustrated in FIG. 2.

The memory interface power management processing 500 initially receives 502 status information. Next, it is determined 504 whether low memory utilization has been detected. Here, low memory utilization is determined 504 based on the status information. As noted above, the status information provides an indication as to whether various resources of a graphics controller are active. If the status information indicates that there is low memory utilization, it is then determined 506 whether the low memory utilization has persisted for a predetermined period. If it is determined that the low memory utilization has persisted for at least the predetermined period, then a reduced speed clock is output 508 to a local memory interface of the graphic controller that controls access to a local memory. On the other hand, when it is determined 504 that memory utilization is high or when it is determined 506 that low memory utilization has not persisted for at least a predetermined period, then a high speed clock is output 510 to the local memory interface.

Typically, the activity detected in this case would be activity beyond the refresh activity that is periodically performed whenever the graphics controller is operational. In general, the speed of the clock being output follows the level of activity. When there is low activity the reduced speed clock is output, and when there is high activity the normal, high speed clock is output. In this way, the speed of the clock supplied to the memory interface (and possibly other memory related components such as a memory bus and the local memory) can be reduced to conserve power when the access load on the local memory is lessened. Consequently, the graphics controller utilizing memory interface power management processing 500 consumes substantially less power than conventionally achieved.

Figure 6:
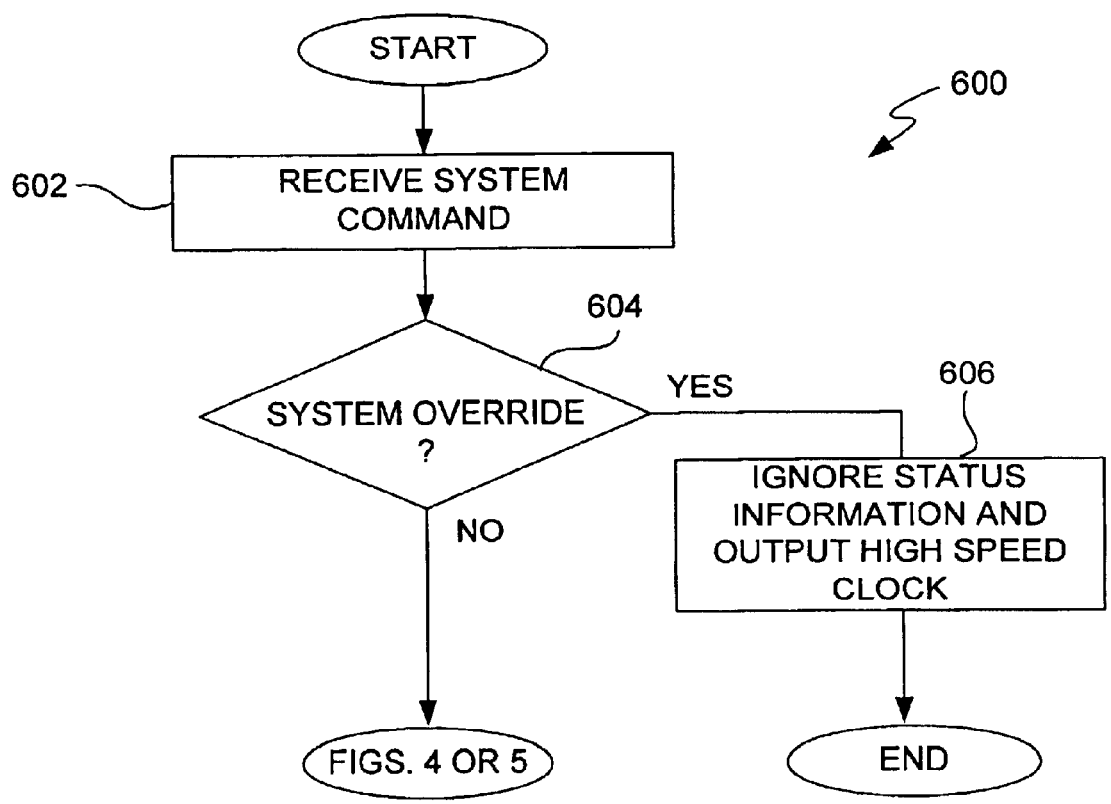
FIG. 6 is the flow diagram of system override processing according to one embodiment of the invention.

FIG. 6 is the flow diagram of system override processing 600 according to one embodiment of the invention. The system override processing 600 operates to receive 602 a system command. As an example, the system command can be the system command (SYS_CMD) illustrated in FIG. 2. The system command is provided by other components within a computer system besides the graphics controller, typically a processing unit or another controller by way of a software request (e.g., driver call by an operating system). The system command could be received within a clock controller as either a control register bit or a specialized command received in a command queue within the clock controller. The system command can request to override the power management being performed by the clock controller within the graphics controller, or could control the clock generation in accordance with its desires. After the system command is received 602, it is determined 604 whether the system command requests a system override. When it is determined 604 that the system command does request a system override, then the status information provided to the clock controller is ignored 606 and the high speed clock is output. Here, the high speed clock would be output and supplied to the local memory interface (and perhaps other memory related components) despite the presence of inactivity within the graphics controller. In other words, with the system override, the high speed clock is output regardless of any detected inactivity because the computer system chooses (by software request) not to conserve power but to operate at maximum speed. Following block 606, the system override processing 600 is complete and ends.

On the other hand, when it is determined 604 that the system command does not request a system override, then the power management processing such as discussed above can be performed (see FIGS. 4 and 5) because the external system command does not override the power management in this case. Hence, software can override (or disable/enable) the power management provided by the invention.

In one implementation of a graphics controller of a computer system according to the invention, the graphics controller has two (2) PLL-generated clocks running and available for use to provide timing for local memory for the graphics controller. Whenever the computer system initiates an external PCI bus read or write to the local memory for the graphics controller, or when any process internal to the graphics controller requires access to the local memory (e.g., graphics engine), the graphics controller uses its maximum memory bandwidth clock. Here, the local memory is accessed as fast as possible, thus maximizing the memory bandwidth. While, at other times, the graphics controller uses its minimum memory bandwidth clock which is just fast enough to support display refresh of a display device from data stored in the local memory.

Although the invention has been primarily described above with respect to a graphics controller chip, the invention is suited for use with any type of controller chip or other chip that includes a local memory interface. As examples, the controller chip or chip can pertain to an I/O controller, an interrupt controller, a bus controller, a microprocessor, an embedded controller, etc.

The invention can use a combination of hardware and software components. The software can be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices. The computer readable medium can also be distributed over a network coupled computer system so that the computer readable code is stored and executed in a distributed fashion.

The advantages of the invention are numerous. Different embodiments or implementations may have one or more of the following advantages. One advantage of the invention is that controllers (e.g., graphic controllers) can operate with substantial power savings while still providing high performance. Another advantage of the invention is that computer systems, particularly battery-powered computer systems, overall consume less power when the controller according to the invention is utilized. Hence, with battery-powered computer systems, battery lifetime (before needing to be recharged) is extended by the invention.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for managing power consumption of a graphics controller having an interface to a local memory, said method comprising:
   (a) determining a bandwidth load on the local memory, wherein said determining (a) includes at least: (a1) determining an amount of non-refresh activity for the graphics controller, and (a2) determining the bandwidth load based on the amount of non-refresh activity; and
   (b) providing a clock to the interface, the clock having a frequency dependent upon the bandwidth load, and the interface providing access to the local memory at a rate determined by the frequency of the clock.

2. A method as recited in claim 1, wherein said method reduces power consumption by the graphics controller by reducing the frequency of the clock when the bandwidth load decreases.

3. A method as recited in claim 2, wherein following the prior reducing of the frequency of the clock, the frequency of the clock rapidly increases as the bandwidth load increases.

4. A method as recited in claim 1,
   wherein said method reduces power consumption by the graphics controller by reducing the frequency of the clock when the bandwidth load decreases, and
   wherein following the reducing of the frequency of the clock, the frequency of the clock rapidly increases as the bandwidth load increases.

5. A method as recited in claim 1,
   wherein the clock is also supplied to the local memory, and
   wherein said method reduces power consumption of the local memory and the interface to the local memory by reducing the frequency of the clock when the bandwidth load decreases.

6. A method for managing power consumption of a controller, a local memory being associated with the controller, said method comprising:
   receiving status information indicating local memory usage requirements for the local memory of the controller, the usage requirements pertaining to an amount of non-refresh activity within the controller;
   determining whether the usage requirements are below a threshold condition; and
   operating the controller to interact with the local memory in accordance with a regular frequency clock when the usage requirements exceed the threshold condition or in accordance with a reduced frequency clock when the local memory usage requirements are below the threshold condition,
   wherein when the reduced frequency clock is used by the controller, power consumption of the controller is substantially lower as compared to the power consumption of the controller when the regular frequency clock is used.

7. A method as recited in claim 6, wherein the controller is a graphics controller.

8. A method as recited in claim 7, wherein the graphics controller performs a refresh operation with respect to a display device associated with the graphics controller, the refresh operation refreshes an image displayed on the display device by retrieving display information for the image from the local memory and thus represents a first usage amount for the local memory, and
   wherein the threshold condition pertains to a local memory usage amount that is greater than the first usage amount for the local memory.

9. A method as recited in claim 8, wherein the graphics controller includes at least one graphics functional unit, and
   wherein the usage requirements for the local memory of the graphics controller include the first usage amount and a usage amount for the at least one graphics functional unit when the at least one graphics functional unit is active.

10. A method as recited in claim 6,
    wherein the controller is a graphics controller,
    wherein the graphics controller includes at least one graphics functional unit, and
    wherein said method further comprises:
       providing the at least one graphics functional unit with a clock;
       determining when the at least one graphics functional unit is inactive; and
       stopping the clock provided to the at least one graphics functional unit when said determining determines that the at least one graphics functional unit is inactive.

11. A graphics controller for use with a computer system including a processor, a system bus and a display device, comprising:
    a system bus interface for coupling to the system bus of the computer system;
    a local memory;
    a local memory interface coupled to said local memory, said local memory interface controls access to said local memory;
    a display interface for coupling to the display device of the computer system;
    an arbitration unit coupled to said system bus interface, said local memory interface, and said display interface, said arbitration unit operates to arbitrate access to said local memory via said local memory interface, said arbitration unit providing a status signal pertaining to bandwidth load on said local memory; and
    a clock controller operatively connected to at least one of said local memory interface, said local memory and said arbitration unit, said clock controller producing a first clock based on the status signal, the first clock being for use by the at least one of said local memory interface and said local memory.

12. A graphics controller as recited in claim 11, wherein the first clock has a reduced frequency when said system bus interface does not require access to said local memory.

13. A graphics controller as recited in claim 12, wherein the reduced frequency of the first clock is at least fast enough to support a refresh operation of the display device.

14. A graphics controller as recited in claim 11,
wherein said graphics controller further comprises:
a graphics engine operatively connected to said arbitration unit, said graphics engine renders complex images to be displayed on the display device, and
wherein said clock controller produces the first clock with a reduced frequency when said graphics engine does not require access to said local memory.

15. A graphics controller as recited in claim 11,
wherein said graphics controller further comprises:
a graphics engine operatively connected to said arbitration unit, said graphics engine renders complex images to be displayed on the display device, and
wherein said clock controller produces the first clock with a reduced frequency when both said graphics engine and said system bus interface do not require access to said local memory.

16. A graphics controller as recited in claim 11,
wherein the reduced frequency of the first clock is at least fast enough to support a refresh operation of the display device,
wherein said graphics controller further comprises:
a monitor operatively connected to said system bus interface, said graphics engine and said clock controller, said monitor operates to determine activity at the system bus interface and said graphic engine that requires usage of said local memory, and
wherein said clock controller produces the clock with a frequency dependent on the activity determined by said monitor.

17. A graphics controller for use with a computer system including a processor, a system bus and a display device, comprising:
a system bus interface for coupling to the system bus of the computer system;
a local memory;
a local memory interface coupled to said local memory, said local memory interface controls access to said local memory;
a display interface for coupling to the display device of the computer system;
a graphics engine operatively connected to said local memory interface, said graphics engine renders complex images to be displayed on the display device;
means for monitoring activity of at least said system bus interface and said graphics engine to produce a memory access load indication; and
means for producing a memory clock signal for use by at least one of said local memory interface and said local memory, the memory clock signal having a frequency that varies depending upon the memory access load indication, wherein the frequency is lower when the memory access load indication indicates a lack of or reduction in memory access activity.

18. A method as recited in claim 6, wherein said operating operates the controller to interact with the local memory in accordance with the reduced frequency clock only after the local memory usage requirements are determined to be below the threshold condition for at least a predetermined period of time.

* * * * *